United States Patent
Altmikus et al.

(10) Patent No.: US 10,865,771 B2
(45) Date of Patent: Dec. 15, 2020

(54) CONTROL OF A WIND TURBINE HAVING ADJUSTABLE ROTOR BLADES

(71) Applicant: Wobben Properties GmbH, Aurich (DE)

(72) Inventors: Andree Altmikus, Aurich (DE); Wolfgang De Boer, Moormerland (DE); Ralf Messing, Aurich (DE)

(73) Assignee: Wobben Properties GmbH, Aurich (DE)

(*) Notice: Subject to any disclaimer, the term of this patent is extended or adjusted under 35 U.S.C. 154(b) by 165 days.

(21) Appl. No.: 15/775,727

(22) PCT Filed: Nov. 17, 2016

(86) PCT No.: PCT/EP2016/077928
§ 371 (c)(1),
(2) Date: May 11, 2018

(87) PCT Pub. No.: WO2017/085156
PCT Pub. Date: May 26, 2017

(65) Prior Publication Data
US 2018/0328339 A1  Nov. 15, 2018

(30) Foreign Application Priority Data
Nov. 18, 2015 (DE) .......... 10 2015 119 986

(51) Int. Cl.
*F03D 7/02* (2006.01)
*F03D 17/00* (2016.01)
*F03D 1/06* (2006.01)

(52) U.S. Cl.
CPC .......... *F03D 7/0224* (2013.01); *F03D 1/06* (2013.01); *F03D 7/024* (2013.01); *F03D 7/026* (2013.01);
(Continued)

(58) Field of Classification Search
None
See application file for complete search history.

(56) References Cited

U.S. PATENT DOCUMENTS 6,619,918 B1 * 9/2003 Rebsdorf .............. F03D 7/0224
416/1
9,777,708 B2 * 10/2017 Risager ................. F03D 7/0224
(Continued)

FOREIGN PATENT DOCUMENTS

EP  0847496 B1  8/2000
EP  2530302 A1  12/2012
(Continued)

*Primary Examiner* — Igor Kershteyn
*Assistant Examiner* — Juan G Flores
(74) *Attorney, Agent, or Firm* — Seed Intellectual Property Law Group LLP

(57) ABSTRACT

A method for controlling a wind turbine having rotor blades with an adjustable blade angle, comprising the steps operating the wind turbine in a partial load mode for wind velocities up to a nominal wind velocity, wherein in the partial load mode, a fixed partial load angle is provided for the blade angle, operating the wind turbine in a full load mode for wind velocities above the nominal wind velocity, wherein in the full load mode the blade angle is enlarged with increasing wind velocity and has values above the partial load angle, and wherein in the partial load mode, starting from a predetermined operating state, the blade angle is reduced as compared with the partial load angle.

14 Claims, 3 Drawing Sheets

(52) U.S. Cl.
CPC .......... *F03D 17/00* (2016.05); *F05B 2220/30* (2013.01); *F05B 2240/221* (2013.01); *F05B 2260/74* (2013.01); *F05B 2260/83* (2013.01); *F05B 2270/1033* (2013.01); *F05B 2270/20* (2013.01); *F05B 2270/309* (2013.01); *F05B 2270/32* (2013.01); *F05B 2270/322* (2013.01); *F05B 2270/327* (2013.01); *F05B 2270/331* (2013.01); *F05B 2270/335* (2013.01); *Y02E 10/72* (2013.01)

(56) References Cited

U.S. PATENT DOCUMENTS

| | | | |
|---|---|---|---|
| 10,364,797 B2 * | 7/2019 | Caponetti | ............ F03D 7/0272 |
| 2013/0134711 A1 | 5/2013 | Spruce | |
| 2013/0136594 A1 | 5/2013 | Casazza et al. | |
| 2014/0017079 A1 | 1/2014 | Grabau | |
| 2014/0084587 A1 | 3/2014 | Beekmann | |
| 2016/0178084 A1 | 6/2016 | White et al. | |
| 2017/0241405 A1 * | 8/2017 | Kruger | ................ G05B 19/048 |
| 2017/0356425 A1 | 12/2017 | Narayanan | |
| 2018/0112646 A1 | 4/2018 | Betran Palomas et al. | |

FOREIGN PATENT DOCUMENTS

| | | | | |
|---|---|---|---|---|
| EP | 2848805 A1 * | 3/2015 | ............ | F03D 7/024 |
| EP | 2848805 A1 | 3/2015 | | |
| EP | 3034867 A1 | 6/2016 | | |
| EP | 3034876 A1 | 6/2016 | | |
| WO | 2011134473 A1 | 11/2011 | | |
| WO | 2012007004 A2 | 1/2012 | | |
| WO | 2016101961 A1 | 6/2016 | | |

* cited by examiner

CONTROL OF A WIND TURBINE HAVING ADJUSTABLE ROTOR BLADES

BACKGROUND

Technical Field

The present invention relates to a method for controlling a wind turbine having rotor blades with an adjustable blade angle. The present invention also relates to a wind turbine having rotor blades with an adjustable blade angle.

Description of the Related Art

Wind turbines having rotor blades with adjustable blade angles are generally known. The adjustment of the blade angles is frequently designated pitching in professional circles, including in German usage. A common control concept for such wind turbines can be gathered, for example, from European patent EP 0 847 496. According to said patent, a turbine is operated in a partial load mode with a fixed blade angle for wind velocities up to a nominal wind velocity. At this blade angle, it is assumed that the wind turbine will operate optimally. In this partial load mode, the wind turbine is then operated with a constant blade angle, so that it outputs more power with increasing wind velocity. For this purpose, a rotational speed power characteristic curve is regularly stored. The control can operate in such a way that the current rotational speed is detected and an output is adjusted in suitable accordance with the stored characteristic curve. Accordingly, the wind turbine then operates at a fixed aerodynamic operating point. However, should the rotational speed increase or decrease, the power is adjusted accordingly until the wind turbine has once more found this one operating point.

This partial load mode reaches to this extent as far as the nominal wind velocity and, when the nominal wind velocity is reached, the nominal power $P_N$ and the nominal rotational speed $n_N$ are regularly also reached.

If the wind then rises further, specifically beyond the nominal wind velocity, then the blade angle is adjusted, that is to say pitched. The at least one rotor blade, nowadays there are usually three rotor blades, is/are then rotated out of the wind in the direction of a feathered position gradually, that is to say successively, as the wind velocity rises. The power and the rotational speed are maintained constant in this case, specifically usually at their nominal values $P_N$ and $n_N$. If the wind velocity still rises more intensely, particularly above a limiting wind velocity, it may be necessary to reduce the rotational speed n and the power P as well, wherein here the blade angle is accordingly very highly pitched. Alternatively, it is possible to switch off at a limiting velocity.

This range above the nominal wind velocity up to the limiting velocity is also designated as the full load mode. The range above the limiting velocity or limiting wind velocity can also be designated as the storm range This control has been tried and tested and is implemented in many wind turbines, probably in most of the wind turbines in the world, at least as regards the control in the partial load mode and in the full load mode and, naturally, if the installation has adjustable rotor blades.

The problem is, now, that, in particular with increasing size of wind turbines, which is also associated with increasing length and lightweight construction of the rotor blades, the assumption of a stiff rotor blade no longer always applies even for simplified calculations and measurements. For this reason, the aforementioned control concept can no longer readily be applied in some cases.

In addition, for such long rotor blades of lightweight construction, previous stability considerations can otherwise reach their limits in their application. For example, reference is made here to the wind turbine from ENERCON, the E-126, which has a rotor diameter of about 126 m and thus, after the nacelle diameter has been subtracted, has rotor blades with a length of virtually 60 m. In the case of this wind turbine, which belongs to the largest wind turbines in the world, the rotor blade is made of many parts and, in an internal region, which also points more closely to the rotor hub, has a steel section. As a result, a certain stiffness can be achieved, and this inner part can also carry an outer blade part made of fiber-reinforced plastic, which does not have to meet the highest requirements on lightweight construction. Experience with such a wind turbine cannot readily be transferred to wind turbines having rotor blades of more lightweight construction.

The German Patent and Trademark Office has searched the following prior art in the priority application relating to the present application: US 2014/0017079 A1, EP 0 847 496 B1, EP 2 530 302 A1, WO 2011/134473 A1, WO 2012/007004 A2 and WO 2016/101961 A1.

BRIEF SUMMARY

Proposed is a solution which in particular takes account of the behavior of long rotor blades of lightweight construction, and in particular takes better account than previous control methods. At least, an alternative as compared with that previously known is to be proposed.

A wind turbine having rotor blades with adjustable blade angles is used as a basis. This is operated in a partial load mode or a full load mode, depending on the wind velocity. In the partial load mode, which is present for wind velocities up to a nominal wind velocity, a first partial load angle is provided which, for example, can be implemented as a fixed value and which will also be designated a partial load angle below.

Above the nominal wind velocity, the wind turbine is operated in the full load mode. Here, the blade angle is enlarged with increasing wind velocity and has values which are greater than the partial load angle. Possibly, this does not have to be true immediately for the initial range of the full load mode Now, for this purpose, it is additionally proposed that, in the partial load mode, starting from a predetermined operating state, the blade angle is reduced as compared with the partial load angle.

The basis here is a definition of the blade angle in which the partial load angle is small and the angle in the feathered position is large. This definition also forms the basis of the aforementioned document EP 0 847 496. According to this definition, an adjustment from the partial load angle in the direction of the feathered direction is also an enlargement of the blade angle. However, it is now proposed to reduce the blade angle in the partial load mode, starting from a predetermined operating state, that is to say in other words, to rotate still further away from a feathered position.

A predetermined operating point can, for example, be a predetermined rotational speed and/or a predetermined power, and the adjustment can then be performed when this predetermined rotational speed value and/or predetermined power value is reached. This adjustment of the blade angle can also be carried out continuously or at least with a flank or ramp. If, therefore, the predetermined operating state is reached, no abrupt adjustment of the blade angle has to be made. This adjustment of the blade angle to a still lower value than previously can be, for example, an adjustment of the blade angle by 2°, 3°, 4° or 5°, to cite a pair of preferred examples.

The basis here is the finding that the rotor blade can no longer be viewed as approximately stiff but changes, in particular twists, during operation, in particular as a result of the loading by the wind. However, this can also occur together and interact with bending, for example. It will be assumed that this change is completely reversible.

In particular, it will be assumed that in a range of lower wind velocities, that is to say before the predetermined operating state is reached, the blade angle experiences only low loading and any changes of the blade can be disregarded. If the wind then increases further, the wind turbine still being in the partial load mode, the blade can twist, for example, in order to use this simple explanation as a basis.

The rotor blade has a blade root, with which it is fixed to the rotor hub. The blade root lies inward toward the rotor hub and therefore toward the axis of rotation of the rotor. Toward the other side, the rotor blade has a blade tip toward the outside. During the torsion cited by way of example, the rotor blade thus changes a blade angle in the region of the rotor blade tip relative to a blade angle in the region of the rotor blade root. The measurement of the blade angle as a basis for the adjustment of the rotor blade angle is normally carried out in the root area, since the adjustment drives for the blade angle, that is to say the so-called pitch drives, are also there.

Now, by adjusting the blade angle in the root region, the change of the blade angle at the blade tip can be counteracted. Expressed in simple terms, it has been found that, under correspondingly higher wind loads in the partial load mode, the blade angle in the region of the blade tip is forced in the direction of the feathered position and therefore enlarged, and can be counteracted by adjusting the blade angle in the opposite direction, namely a reduction in the blade angle.

The basis here is also the finding that a quite substantial part of the power is generated in the outer region of the rotor and the best possible operation of the wind turbine should also be ensured there. Should the position of the rotor blade in the region of the blade root be made worse thereby, it is less important than the best possible setting of the blade in the region of the blade tip, at least in the outermost third of the rotor blade toward the blade tip.

It is pointed out as a precaution that this differentiation in different blade angles is used for explanation without thereby changing the definition of the blade angle, specifically the position of the blade in the root region. Ultimately, despite torsion, the entire blade is adjusted by the adjustment of the blade angle in the root region.

According to one embodiment, it is therefore also proposed to adjust the blade angle as compared with the partial load angle, specifically depending on torsion of at least one of the rotor blades about its blade longitudinal axis. It is possible here, for example, for the torsion of the rotor blade to be measured and for said torsion measurement to form the input to a blade angle control system. Here, too, the blade angle in the partial load mode can initially remain unchanged, specifically at the partial load angle. Here, in the case of a wind turbine having multiple, in particular three, rotor blades, it is nevertheless possible for only the torsion of one blade to be detected and on this basis for the blade angles of all the blades to be changed as proposed. Optimization could be achieved by an individual adjustment of the blade angle of each individual rotor blade, although this would not be the favored solution because of the outlay to be expended, but likewise is not to be ruled out.

This twisting of the rotor blade can be determined by other operating parameters, which is proposed in accordance with one embodiment. For example, in addition to a rotational speed power characteristic curve, torsion, which is established from experience, can also be stored. Such a stored torsion curve can, for example, be recorded in advance or determined once for the installation type. It is also a consideration to incorporate further parameters, such as for example the wind velocity or other properties of the current wind or of the air, including air density and humidity. A variation in the wind velocity over height, which can also be designated as wind shear, also belongs to such properties of the wind. A property of the wind which can be taken into account is also a variation in the wind direction over height, which is also designated as wind veer.

Torsion of the rotor blade can also be detected by using multiple measuring sensors distributed along the rotor blade.

The adjustment is preferably carried out on the basis of blade loading. Such a blade loading can be detected by measurement, for example, for this purpose. One possibility would be to detect bending of the rotor blade by means of a strain gauge and to draw conclusions about the loading from the detected bending. In order to draw conclusions about loading from bending, a relationship previously recorded for the relevant rotor blade or the relevant rotor blade type can be used. Such a loading can also give information about the torsion to be assumed, even if the loading measurement relates to strain along a longitudinal axis. Here, the basis is the finding that such a loading in the longitudinal direction is brought about by correspondingly strong wind, and the same wind also leads to torsion.

According to one embodiment, in the partial load mode a power is set as a function of a rotational speed. This can be done, for example, on the basis of a known rotational speed/power characteristic curve. In relation to this type of control in the partial load mode, it is now proposed, beginning from a predetermined rotational speed, to adjust, specifically to reduce, the blade angle as compared with the partial load angle. The fact that the power is set as a function of the rotational speed means that respective operating points are established which permit a quite reliable statement about the state of the wind turbine, including about the torsion of the rotor blades. Therefore, in this case, it is possible to draw conclusions very well about the torsion of the rotor blades from the rotational speed which is established, and the adjustment of the blade angle is performed accordingly. This is similarly true of the power which, during the control via the rotational speed/power characteristic curve, likewise permits conclusions to be drawn about the state of the wind turbine.

It is preferably proposed that, with higher and higher rotational speed or with higher and higher power, the blade angle is adjusted as a function of the rotational speed or as a function of the power. If, therefore, the rotational speed increases further above this predetermined rotational speed, it is proposed to adjust the blade angle further. The corresponding action is proposed when the blade angle is adjusted from a predetermined power.

In particular, it is proposed that the blade angle is reset to the partial load angle before the full load mode is reached.

In particular, the control according to this but preferably also according to the remaining embodiments assumes that a first partial load angle is stored. This thus forms the starting position and basis for the control in the partial load mode.

Deviations therefrom are then specifically made, depending on specific criteria. If the full load mode is achieved and if the wind velocity rises further, the blade angle is enlarged, specifically in the direction of the feathered position. The resetting of the blade angle which has been reduced in the partial load mode to the partial load angle is thus already an adjustment toward the feathered position and that is preferably proposed toward the end of the partial load mode. In the full load mode, the blade angle can be adjusted further in the direction of the feathered position as the wind velocity increases further.

According to one embodiment, it is proposed that the blade angle be reduced so highly as compared with the partial load angle that it assumes a negative value. For example, the partial load angle can have the value 5°, and the blade angle can be reduced to a value of −2° in the partial load mode. A further, less extreme example would be if the partial load angle were to have a value of 3° and the blade angle were then to be reduced to a value of −1° in the partial load mode. The background to this embodiment is that it has been found this a blade angle reduction may be expedient even to such a high extent. In particular that torsion of a corresponding order of magnitude can occur and that this torsion of the rotor blade is even maintained despite its oppositely directed adjustment of the rotor blade. This embodiment also underlines the fact that the reduction of the rotor blade angle goes especially beyond a minimum readjustment of the blade angle for other reasons, such as for example compensation for an inaccuracy.

Preferably, a method is proposed in which the partial load mode is divided into at least two ranges, specifically into a lower range and into an upper range. The lower range is that at lower wind velocity and the upper correspondingly at higher wind velocity. In the partial load mode, the partial load angle is used in the lower range, that is to say not adjusted. Only in the upper range of the partial load mode is the blade angle then reduced as compared with the partial load angle. In the subsequent full load mode, the blade angle is then increased as compared with the partial load angle. Thus, at least three regions are clearly provided, namely a lower region in the partial load mode, in which blade torsion still plays no part. An upper range in the partial load mode is then proposed, in which the torsion of the blade angle can play a part and is counteracted. Finally, in the full load mode, an increase in the blade angle is proposed in order to reduce the loading of the installation by the correspondingly high wind. Care must therefore be taken that, in the upper range of the partial load mode, with rising wind the partial load angle is adjusted at least section by section in a direction which is directed counter to the direction in the full load mode.

Here, the reduction of the blade angle in the upper range of the partial load mode does not have to be carried out exactly to the full load mode, and also in the full load mode, the increase in the blade angle beyond the partial load angle does not have to be carried out immediately directly following the upper range of the partial load mode. Preferably, a transition region between the upper range of the partial load mode and full load mode is proposed, in which a blade angle is changed from its value reduced as compared with the partial load angle to the value increased as compared with the partial load angle, preferably depending on the wind velocity.

In particular, it is proposed that the blade angle be already increased toward the end of the partial load mode and therefore toward the end of the upper range of the partial load mode. Preferably, for this purpose it is proposed to define a third range in the partial load range, which is provided between the upper range of the partial load mode and the full load mode as part of the partial load mode. Preferably, this third range of the partial load mode is used a transition region to the full load mode.

In relation to this third range in the partial load mode, it is proposed that the blade angle be increased in the third range of the partial load mode, in particular with rising wind velocity.

Such a transition region does not have to be provided, however, or can lie in the range of the nominal wind velocity. According to one variant, the blade angle can be reduced to a small blade angle as far as the nominal wind velocity, in order then, with the wind velocity rising further, to rise from this small blade angle to a value up to the partial load angle. Then or for this purpose, the rotational speed control, which adjusts the blade angle to control the rotational speed and which specifically increases the blade angle with rising wind velocity, can take over the blade adjustment, in order as far as possible to maintain the nominal rotational speed or another rotational speed value.

Preferably, in the partial load mode, in any case in the upper range of the partial load mode, the blade angle is adjusted as a function of the power, whereas in the full load mode the blade angle is adjusted as a function of the rotational speed.

According to one embodiment, it is proposed that the reduction in the blade angle is changed on the basis of a predefined relationship, in particular as a function of the rotational speed and/or as a function of the power. This relationship can preferably be predefined by a gradient.

As a result, it is particularly easy to achieve the situation in which this reduction in the blade angle is not carried out abruptly but gradually. Previously determined findings about the torsional behavior of the rotor blade can also be incorporated in this gradient.

Such a rotational speed-dependent or power-dependent change in the blade angle can be implemented by the gradient, by an appropriate function or else by a stored table, a so-called look-up table. Even by means of the look-up table, a quasi-continuous change can be achieved in a simple way by means of appropriately many values.

According to one embodiment, it is proposed that the blade angle in the partial load mode be adjusted as compared with the partial load angle as a function of a characteristic of the wind, in particular as a function of a gustiness of the wind.

It is thus proposed to incorporate the gustiness and, additionally or alternatively, a gust frequency of the prevailing wind in the method as well. One possible definition of a gust would be if the measured one-minute average of the wind velocity within a few seconds, for example lasting at most 20 seconds and at least 3 seconds, is exceeded by at least 3 m/s. A gust can also be performed by a comparison of the current wind velocity with a 10-minute average, wherein a slight excess, e.g., in the range from 1.7 m/s, can then be viewed as a gust. Accordingly, a gust can be detected and it is therefore also possible to count gusts and thus to determine their frequency, that is to say occurrence per time interval.

As a result, the reduction in the blade angle preferably counteracts torsion of the rotor blade on account of the prevailing wind load or a change in a local angle of attack. In particular, the previous explanations have assumed ideal, in particular constant wind conditions, apart from a few named exceptions. In actual fact, the behavior of the wind is more complex and, for example, the wind can more or less frequently have more or less intense gusts. In particular when there are intense gusts, there is the risk that the wind is quite strong and the wind turbine will rotate with a quite high rotational speed, even though still in partial load mode, and generate correspondingly much power. At least some of the previously described embodiments will then perform a reduction in the blade angle.

However, if this aforementioned high rotational speed with high power results with a highly gusty wind, there will be regions in between with a very weak wind, in which the rotor blade can also twist back again, at least to some extent. In particular if the blade twists back abruptly on account of a gust and the pitch control initially does not react and thus negative blade angles are present, then the local effective angle of attack rises further and there is the risk of flow separation. For this reason, in the event of high gustiness, the reduction in the pitch angle should be moderated.

Accordingly, the aforementioned adjustment of the blade angle as a function of the gustiness of the wind is proposed. In particular, it is proposed to carry out the reduction in the blade angle all the more cautiously, that is to say ever less, the gustier the wind is. On the other hand, if the gustiness is low, the risk of local calm periods is also low, so that the blade angle reduction can be performed more sharply than in the case of highly gusty wind.

Other characteristics of the wind are also considered, such as a highly rotating wind. A blade angle reduction should also be less sharp in such a case.

It is preferably proposed to reduce the blade angle all the less the more highly the wind deviates from an ideal wind characteristic. Preferably, a stability factor is proposed for this purpose, which can, for example, assume values from 0 to 1, wherein the value 1 indicates a steady, that is to say ideal, wind, and the value 0 a wind that is not steady from any point of view, that is to say a wind with high gustiness and intense changes of direction, high shear and high veer, to name just a few examples. The reduction in the blade angle then depends on this stability factor. In particular, it is proposed to multiply the ideally provided adjustment of the blade angle, which therefore takes no gustiness into account, by the stability factor.

It is preferably proposed that the blade angle in the partial load mode be adjusted as compared with the partial load angle as a function of at least one property of the air. For example, the adjustment can be provided as a function of the air density, particularly such that the blade angle is reduced less, the lower the air density is. For this purpose, it has been detected that lower air densities can lead to increased effective blade angles.

In addition or alternatively, provision can be made to define a reversal point, at which the reduction in the blade angle is canceled. Preferably, this reversal point is chosen as a function of the characteristics of the wind. In particular, the reversal point is set earlier as a function of the wind velocity when high gustiness is present.

In addition or alternatively, the transition from the upper range in the partial load mode to the third range in the partial load mode can be changed as a function of a characteristic of the wind. It is also ultimately influenced when the reduction in the blade angle is canceled again. It may also be possible for the reduction in the blade angle to be less overall as a result.

Here, particularly when displacing the reversal point or when displacing the limits from upper to third ranges, care must be taken that weaker winds do not necessarily but usually tend also to be more stable in their behavior. Accordingly, a blade angle reduction may be advantageous or less critical when the winds are weaker than in the case of stronger winds, that is to say stronger or higher wind velocities.

According to one embodiment, it is proposed that measuring means be provided to detect torsion of at least one of the rotor blades about its longitudinal axis, and the torsion thus detected be used as a criterion for adjusting the blade angle. In particular, it is proposed that the blade angle be adjusted more sharply the higher the detected torsion is.

As a result of the detection of the torsion, it is possible to assume a reliable measure which can be used as a criterion for the reduction in the blade angle. In this way, the increased outlay for the provision of such sensors can be justified. Such detected values about the torsion are preferably also used as a basis for the control of the wind turbine for other purposes.

The detection of such torsion can be carried out, for example, via strain gauges or optically by means of corresponding cameras on the respective blade or on the nacelle or on the propeller hub of the wind turbine. Preferably, sensitive acceleration sensors can also detect the torsional movement as such, in order to calculate the absolute torsion on this basis.

According to one refinement, it is proposed that the wind turbine have multiple rotor blades, in particular three, and that each rotor blade be adjusted individually and, additionally or alternatively, cyclically in rotation. As a result, it is possible to take account of the fact that each rotor blade is located in another position in relation to the others and therefore is also regularly subjected to other wind conditions, which changes continuously as a result of the rotation of the rotor. It is possible to take account thereof as a result. Preferably, it is proposed for each rotor blade that the individual blade angle of the respective rotor blade or its setpoint be composed of a basic angle that is the same for all the rotor blades and an additional angle provided individually for each rotor blade. Thus, as a result of the use of the basic angle for all the rotor blades, the fundamental serviceability of the wind turbine can be ensured.

As a result of changing the respective additional angle, improvements can then be implemented. In particular in the partial load mode, the partial load angle can be used as a basic angle and the proposed blade reduction can be implemented by its forming the additional angle in each case or part of the additional angle. Here, it is also worth considering that the reduction in the blade angle forms a component in the additional angle which is the same for all the blades. In particular if the torsion is detected individually for each rotor blade, which is proposed in accordance with one embodiment, an individual blade reduction for each individual rotor blade can be provided as a function thereof. This individual blade reduction can be implemented via this additional angle.

A composition of the blade angle from basic angle and additional angle can also be the same for all the rotor blades of the wind turbine; it can therefore also be used when the rotor blade angles are not adjusted individually but together or synchronously.

According to one embodiment, it is proposed that a minimum blade angle be provided, that is to say predefined in terms of control or otherwise, and implemented. This minimum blade angle is smaller than the partial load angle and forms a lower limit for the blade angle, so that the blade angle cannot be set smaller than this minimum blade angle. If appropriate, the blades can be adjusted individually, as has been described above, but this can be done only up to a certain minimum blade angle. As a result, an excessive reduction in the blade angle overall can be achieved, at the same time an individual adjustment remaining possible.

Provided is also a wind turbine which is prepared to use a method according to at least one of the above-described embodiments. Preferably, this subsequent control is already taken into account during the dimensioning of the wind turbine and, as a result, it is possible to use particularly lightweight rotor blades, which otherwise could not be used or could be used only less successfully.

BRIEF DESCRIPTION OF THE SEVERAL VIEWS OF THE DRAWINGS

In the following, the invention will be explained in more detail by way of example by using exemplary embodiments and with reference to the accompanying figures.

DETAILED DESCRIPTION

Figure 1:
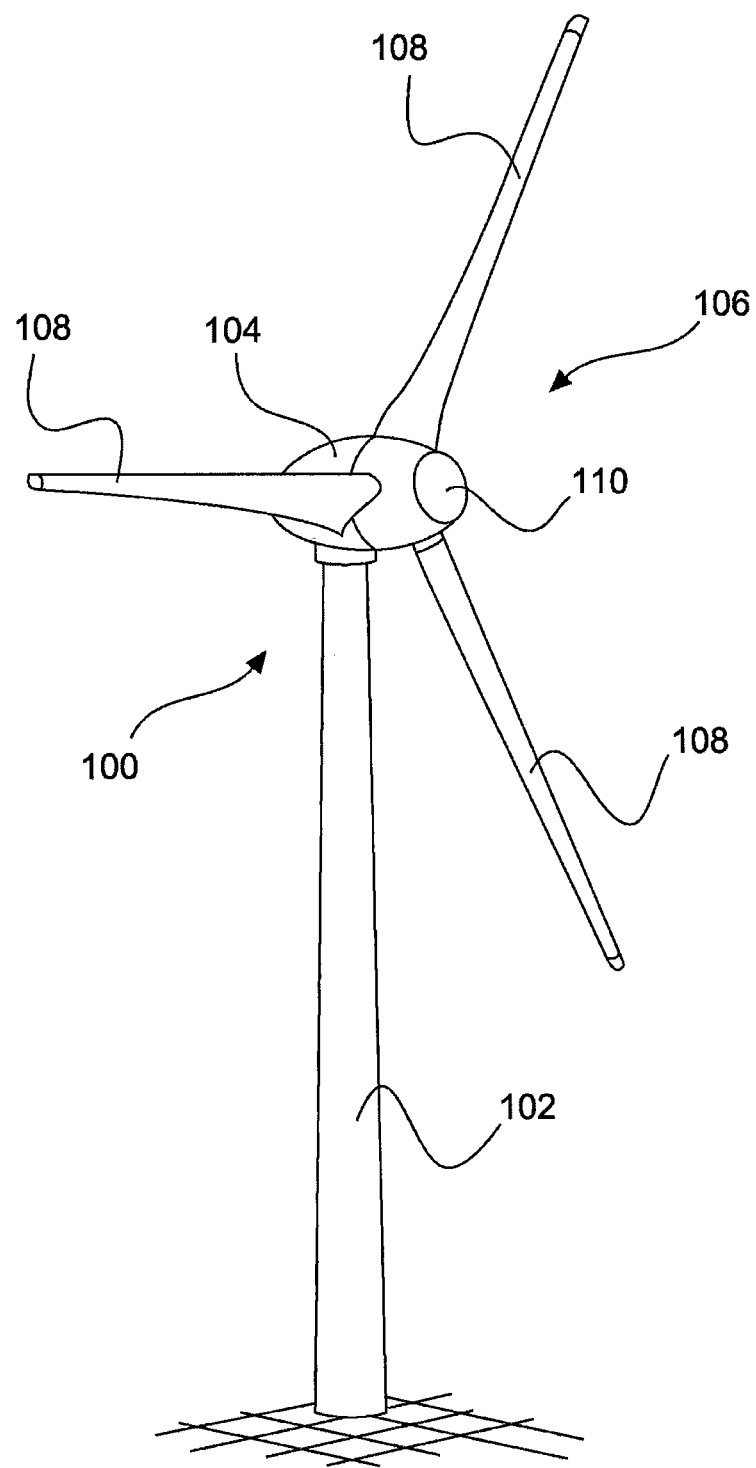
FIG. 1 shows a wind turbine in a perspective view.

FIG. 1 shows a wind turbine 100 having a tower 2 and a nacelle 104. Arranged on the nacelle 104 is a rotor 106 having three rotor blades 108 and a propeller hub 110. The rotor 106 is set moving rotationally by the wind during operation and, as a result, drives a generator in the nacelle 104.

Figure 2:
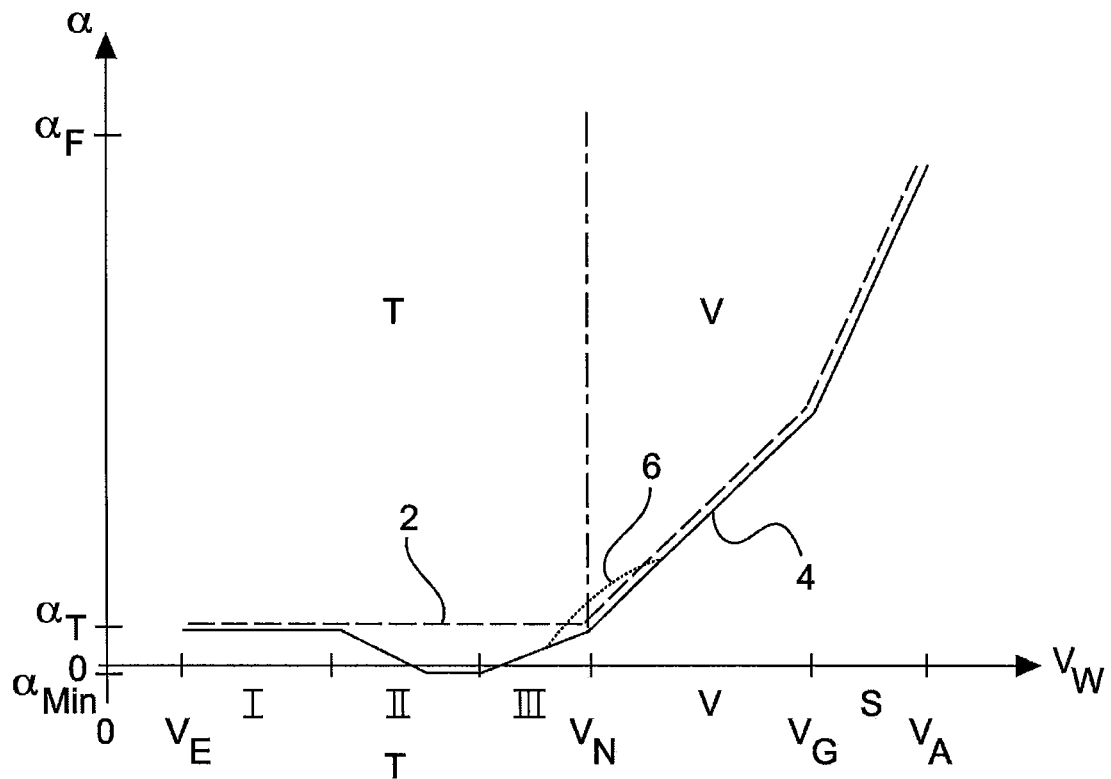
FIG. 2 explains, schematically, possible variations in the blade angle.
Figure 3:
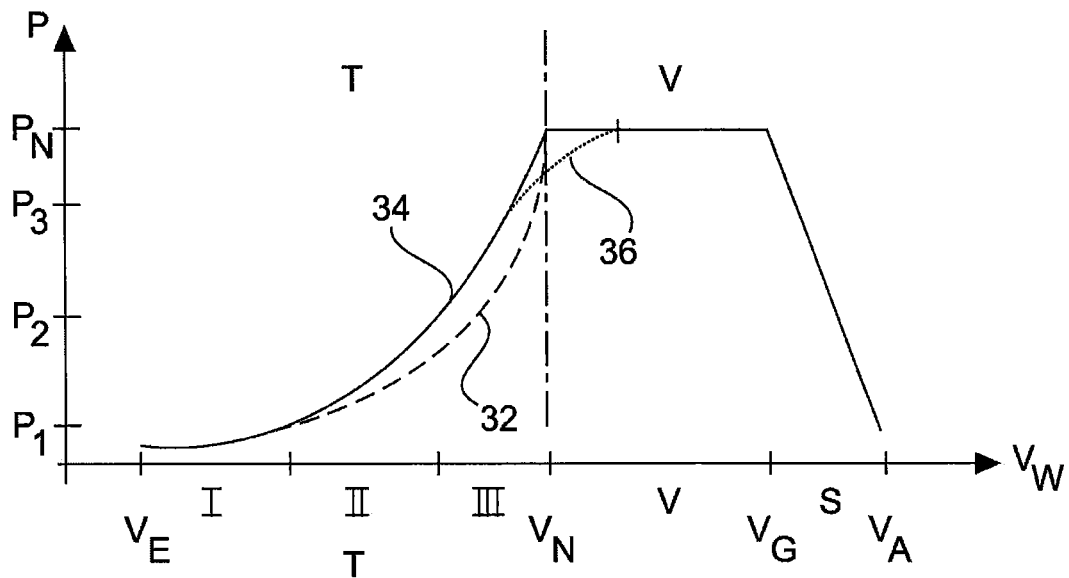
FIG. 3 explains, schematically, possible power curves.

FIGS. 2 and 3 explain possible variations in the blade angle $\alpha$ and the power P as a function of the wind velocity $V_W$. Both FIGS. 2 and 3 show on their abscissa the wind velocity $V_W$, and the abscissa are the same for both FIGS. 2 and 3. To this extent, the illustration of the power P in FIG. 3 should also be assigned to the corresponding blade angles $\alpha$ in FIG. 2, this association being only schematic and not qualitative.

In FIG. 2, a basic curve 2 for the blade angle $\alpha$ is shown by the dashed line. In addition, an improved curve 4 relating to the blade angle $\alpha$ is illustrated by a continuous line. The improved curve 4 coincides with the basic curve 2 in many sections, and these two curves are shown at a slight distance merely for reasons of improved illustration. An alternative curve 6 is illustrated by a dotted line, and this alternative curve 6 otherwise corresponds to the improved curve 4 of the blade angle $\alpha$.

Starting from the basic curve 2, the wind turbine starts at a switch-on wind velocity $V_E$ with an initially first set partial load angle $\alpha_T$. As the wind rises, this angle is maintained up to the nominal wind velocity $V_N$. When the nominal wind velocity $V_N$ is reached, the blade is then rotated out of the wind, namely gradually as the wind velocity rises further, and this means that the blade angle $\alpha$ is accordingly increased little by little. Merely by way of example, the feathered position is shown as $\alpha_F$ as the last value for the angle.

This basic curve 2 thus exhibits a constant blade angle $\alpha$ with the value of the partial load angle $\alpha_t$ in the partial load mode T and then a rising value for the full load operation V. For completeness, a sharper rise of the blade angle for the storm range S is shown, thus the blade angle is increased more sharply after a limiting wind velocity $V_G$ has been reached, until it finally reaches a feathered position, that is to say the angle $\alpha_F$, at a shut-down wind velocity $V_A$. It is of no consequence here that this happens exactly at the shut-down wind velocity $V_A$ and whether the feathered position is then actually reached, as FIG. 2 shows.

As an improved curve 4, the curve illustrated by the continuous line is now proposed. For this purpose, for improved clarity but also as orientation for the control which has to implement the same, the partial load mode T is subdivided into three sections I, II and III. Here, the section I designates a lower range of the partial load mode, the section II designates an upper range of the partial load mode, and section III finally designates a third range of the partial load mode which, based on the wind velocity, is located above the upper range II. These sections can also be designated synonymously as ranges. At the end of the third range III, which lies at the nominal wind velocity $V_N$, the full load mode V begins.

In the lower range I, the improved curve 4 coincides with the basic curve 2. At the start of the upper range II, it is then assumed that the wind load is so high that the blade twists significantly and accordingly is counteracted by a reduction in the blade angle $\alpha$. The blade angle $\alpha$ in this embodiment then decreases linearly with increasing wind velocity $V_W$. This reduction goes so far that the blade angle $\alpha$ becomes negative. It then reaches a predefined minimum blade angle $\alpha_{min}$, which here accordingly has a negative value, and thus the blade angle $\alpha$ is then not reduced further and thus maintains this negative value as far as the end of the upper range II of the partial load mode.

At the end of the upper range of the partial load mode T, the blade angle is then increased again, specifically linearly in the example as the wind rises as far as the partial load angle $\alpha_T$, which is reached when the wind velocity $V_W$ reaches nominal wind velocity $V_N$. Accordingly, in this embodiment, a linear rise in the blade angle up to the partial load angle is proposed in this third range III of the partial load mode.

When the nominal wind velocity $V_N$ is reached, the blade angle of the improved curve 4 thus has the partial load angle $\alpha_T$ again and, at that point, the characteristic course of the basic curve 2 is again reached. The further course of the improved curve 4 can then correspond to the further course of the basic curve 2, which is accordingly illustrated in FIG. 2.

As an alternative curve 6 to the improved curve 4, a deviation in the transition range from the partial load mode T to the full load mode V is proposed. Accordingly, as indicated by the dotted characteristic curve 6, the blade angle is already increased toward the end of the partial load mode, here specifically toward the end also of the third range of the partial load mode, such that it exceeds the value of the partial load angle before the nominal wind velocity $V_N$ is reached. In this way, a lower loading can be achieved in this critical transition region. In this regard, it must be noted that the loading of the blades can be the greatest at the nominal wind velocity. This is because, at the nominal wind velocity, a quite strong wind is already present, but the rotor blades are usually not yet rotated out of the wind, not even partially. The blades therefore offer the greatest angle of attack there. This can be improved by the proposed alternative curve 6. This improved curve 6 then opens into the basic curve 2 and/or into the improved curve 4 at a somewhat higher wind velocity.

FIG. 3 shows, at least schematically, a possible power curve which is associated with the respective curves of the blade angles according to FIG. 2.

In FIG. 3, the basic curve 32 is also illustrated dashed, and an improved curve 34 is plotted with a continuous line. In addition, an alternative curve 36 is shown as a dotted characteristic curve in FIG. 3. These three curves 32, 34 and 36 thus correspond to the curves 2, 4 and 6 of the blade angle according to FIG. 2, with the difference that the power is illustrated here. Differing from FIG. 2, in relation to the basic curve 32 and the improved curve 34, the basic curve 32 is shown only if it differs from the improved curve 34.

It can thus in principle be seen for the basic curve 32 and the improved curve 34 that the power is connected at the start-up wind velocity $V_E$ and has a low value. The power then rises continuously but always more sharply until, at the end of the partial load mode T, it has reached its nominal value $P_N$ at the nominal wind velocity $V_N$. This nominal value is then maintained for the full load mode V and, starting at the limiting wind velocity $V_G$, is reduced and, toward the end of the storm range S, reaches a low value, which can also be zero, at the shut-down wind velocity $V_A$.

FIG. 3 now shows that the basic curve 32 deviates at the start of the upper range II of the partial load mode T, specifically has a somewhat lower power. Initially, however, it can be seen that this deviation begins at a power value $P_1$. This power value $P_1$ can thus serve as a predetermined power, starting from which the reduction in the blade angle, which is shown in relation to the improved curve 4 in FIG. 2, begins.

Once the power curve of the improved curve 34 reaches the second predetermined power value $P_2$, this can be evaluated as information or used as a basis that the end of the upper range II of the partial load mode has been reached and the blade angle should be increased again, as illustrated in FIG. 2. Accordingly, in the third range III of the partial load mode T, the blade angle is increased again and reaches the partial load angle $\alpha_T$ at nominal wind velocity. Accordingly, the basic curve 32 and the improved curve 34 then also coincide with regard to the power P produced.

It can be seen from this FIG. 3 that, as a result of the proposed reduction in the blade angle, the power yield can sometimes also be increased. However, it can also be seen that advantages in the course of the power can also additionally result here. In particular toward the end of the partial load mode T, the rise in the power is very sharp. This means that small changes in the wind velocity can lead to large changes in the power. In the practical implementation, this can mean that small changes in the rotational speed can lead to sharp changes in the power. This can throw up control problems, and the proposed reduction and then increase again in the blade angle can lead to a not quite so steep rise in the power P in this range, even according to practically chosen values.

The alternative curve 36 for the power P shows in FIG. 3 that, in the transition range from partial load mode T to full load mode V, the power can be reduced somewhat as compared with the improved curve 34 and also as compared with the basic curve 32. For this purpose, however, in this specific range the loading of the blades is reduced, and also the rise of the power P can be reduced again in this range, which may be advantageous for the implementation of the control.

Figure 4:
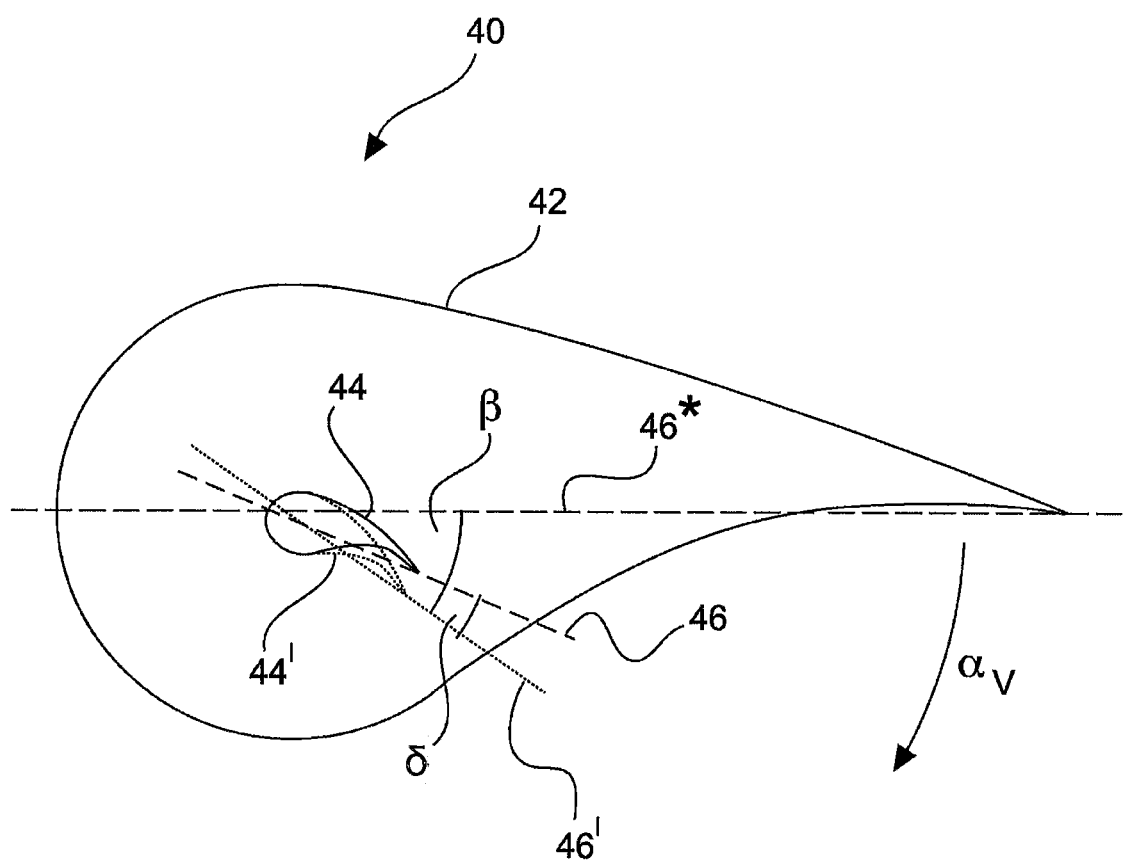
FIG. 4 shows, schematically, profiles of a rotor blade in order to explain possible torsion.

FIG. 4 now basically shows two profiles 42 and 44 of a rotor blade 40. The first profile 42 is in the vicinity of the blade root, and the second profile 44 is in the vicinity of the blade tip. Here, too, the profiles are also illustrated only schematically in their size. In relation to the second profile 44, a rest profile 44' is also shown dotted. The second profile 44 and the rest profile 44' are identical, with the difference that the second profile 44 is rotated as compared with the rest profile 44' because of torsion in the rotor blade 40. This is shown as torsion angle δ. As a reference alignment, for each of the profiles a skeleton line 46, 46' and 46* has approximately been used as a basis here.

In any case, it can be gathered from FIG. 4 that in its rest position, that is to say when it is already finished in the factory, the rotor blade 40 has a rotational angle between the first 42 in the root region and the second profile 44 at the blade tip. To this extent, FIG. 4 shows an operating point at which the rotor blade 40 is in use and the wind has led to torsion, accordingly the second profile 44 is rotated by the torsion angle δ as compared with the rest profile 44', that is to say the second profile 44 in the rest position. The blade 40 is thus twisted and leads to this angular deviation according to δ. This situation can, for example, correspond to the stage at the end of the upper range II or at the start of the third range III of the partial load mode T, based on FIG. 2.

FIG. 4 also illustrates to this extent that this torsion of the rotor blade by the wind loading leads to the rotor blade 40 being rotated somewhat more in the direction of the feathered position $\alpha_F$, particularly in the region of its rotor blade tip. The rotation into the feathered position is an increase in the blade angle, and it is thus proposed to reduce the blade angle in order to counteract this. This reduction direction is shown as $\alpha_v$ in FIG. 4 with a corresponding arrow for illustration. The length of this arrow $\alpha_v$ is not important here.

By means of the proposed method, effects as a result of the blade torsion during operation, which is illustrated in FIG. 4, can thus be counteracted. This counteraction is illustrated in particular by the improved curve 4 of the blade angle α according to FIG. 2, and the power curves in principle resulting therefrom can in this respect be gathered from FIG. 3.

The invention claimed is:

1. A method for controlling a wind turbine having rotor blades with adjustable blade angles, the method comprising:
   operating the wind turbine in a partial load mode for wind velocities up to a nominal wind velocity, wherein in the partial load mode:
      a first partial load angle is provided for the adjustable blade angle, and
      starting from a predetermined operating state, the adjustable blade angle is reduced as compared with the first partial load angle, and
   operating the wind turbine in a full load mode for wind velocities above the nominal wind velocity, wherein in the full load mode the adjustable blade angle is enlarged with increasing wind velocity and has values above the first partial load angle,
   wherein in the partial load mode, a power is set as a function of the rotational speed of a rotor of the wind turbine, and, starting from at least one of a predetermined rotational speed and a predetermined power, the adjustable blade angle is adjusted as compared with the first partial load angle, and wherein the adjustable blade angle is reset to the first partial load angle before the full load mode is reached, wherein sensors are provided to detect torsion of at least one of the rotor blades about its longitudinal axis, wherein the detected torsion is used as a criterion for adjusting the adjustable blade angle, and wherein the adjustable blade angle is adjusted to have a sharper rise as a value of the detected torsion increases.

2. The method as claimed in claim 1, wherein in the partial load mode, the adjustable blade angle is adjusted as compared with the first partial load angle as a function of torsion of the rotor blades about the blade longitudinal axis, a blade loading, or both.

3. The method as claimed in claim 2, wherein the adjustable blade angle is adjusted as the rotational speed rises or as the power rises as a function of the rotational speed or the power.

4. The method as claimed in claim 1, wherein the adjustable blade angle is reduced so highly as compared with the first partial load angle that the blade angle assumes a negative value.

5. The method as claimed in claim 1, wherein, as the wind velocity increases, the adjustable blade angle
- in the partial load mode initially has the first partial load angle in a lower range,
- in the partial load mode is reduced as compared with the first partial load angle in an upper range, and
- in the full load mode, is increased as compared with the first partial load angle.

6. The method as claimed in claim 5, wherein in the partial load mode, following the upper range, a third range is provided, wherein the third range follows the full load mode in that the adjustable blade angle is increased at least as far as the first partial load angle.

7. The method as claimed in claim 5, wherein the upper range in the partial load mode, the adjustable blade angle is reduced as a function of:
- the power,
- the rotational speed of the rotor of the wind turbine with a predetermined gradient, or
- a predetermined relationship of the power or rotational speed.

8. The method as claimed in claim 1, wherein in the partial load mode, the adjustable blade angle is adjusted as compared with the first partial load angle as a function of at least one property of the air.

9. The method as claimed in claim 8, wherein in the partial load mode, the adjustable blade angle is adjusted as compared with the first partial load angle as a function of the air density or of a wind gust.

10. The method as claimed in claim 1, wherein the wind turbine has a plurality of rotor blades, and each rotor blade is configured to be adjusted individually.

11. The method as claimed in claim 10, wherein the wind turbine has three rotor blades.

12. The method as claimed in claim 10, wherein each rotor blade is configured to be adjusted cyclically in rotation such that the individual blade angle or a blade angle set point comprises a basic angle that is the same for all the rotor blades and an additional angle provided individually for each rotor blade.

13. The method as claimed in claim 1, wherein a minimum blade angle is provided, wherein the minimum blade angle is smaller than the first partial load angle, and wherein the adjustable blade angle for each rotor blade is configured to be individually adjusted to the minimum blade angle.

14. A wind turbine, configured to perform a method as claimed in claim 1.

* * * * *